United States Patent Office 2,819,117
Patented Jan. 7, 1958

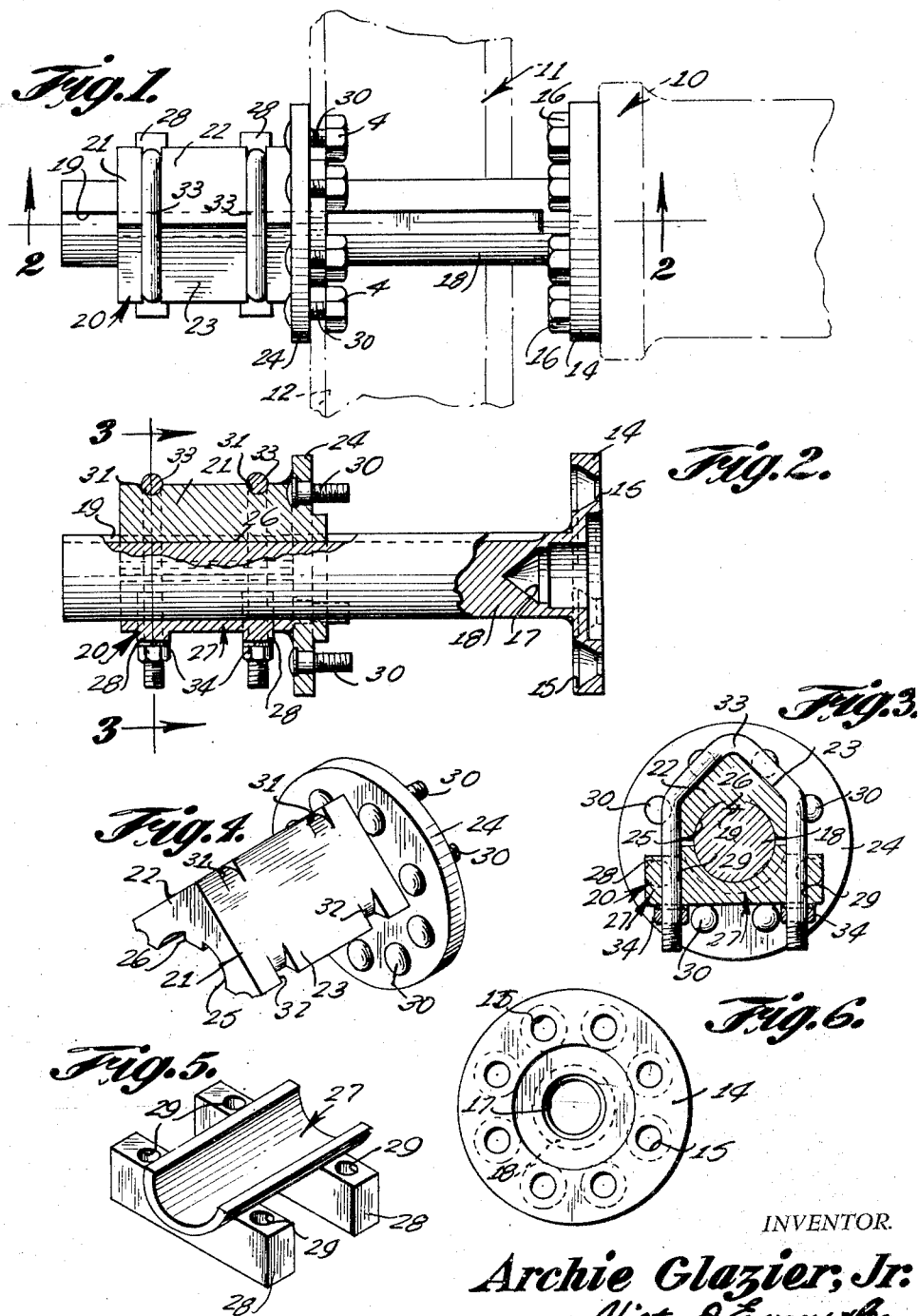

2,819,117

AXLE ADAPTER FOR ADJUSTABLE WHEEL

Archie Glazier, Jr., Fort Morgan, Colo., assignor of fifty percent to Rollie O. Giles, Garden Grove, Calif.

Application January 8, 1954, Serial No. 402,881

1 Claim. (Cl. 301—1)

This invention relates to a tractor, and more particularly to a sliding axle adapter for a tractor.

The object of the invention is to provide an adapter for a tractor axle whereby various sizes of treads, settings or wheels can be obtained with ease and rapidity.

Another object of the invention is to provide an axle adapter which can be varied in position to accommodate wheels of different sizes whereby the various widths of rows can be readily worked.

A further object of the invention is to provide an adjustable sliding axle adapter which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the adjustable sliding axle adapter of the present invention.

Figure 2 is a sectional view taken on the line 2—2 of Figure 1.

Figure 3 is a sectional view taken on the line 3—3 of Figure 2.

Figure 4 is a perspective view of the top part of the adjustable sleeve.

Figure 5 is a perspective view of the bottom part or casing forming part of the adjustable sleeve.

Figure 6 is an end elevational view of the part shown in Figure 4.

Referring in detail to the drawings, the numeral 10 designates a portion of a tractor hub, broken lines Figure 1, while the numeral 11 designates in broken lines a tractor rear wheel. The wheel 11 may be provided with a rim 12. The present invention is directed to an adjustable sliding axle adapter which can be readily adjusted to accommodate wheels 11 of various sizes. Thus, depending upon the size of the row being worked, the farmer changes the rear wheels 11 and by means of the present invention the mounting of the wheels is greatly simplified and speeded up.

The adapter of the present invention includes a plate 14 which may be circular, and the plate 14 is adapted to be secured to the tractor hub 10. It is to be understood that one of the adapters is to be used for each end of the rear portion of the tractor. The plate 14 is provided with a plurality of countersunk openings 15 whereby suitable securing elements 16 can be extended through the openings 15 for securing the plate 14 to the hub 10. A recess 17 may be provided whereby the usual projecting portion of the tractor hub can be received therein.

Extending outwardly from the plate 14 and secured thereto in any suitable manner, as for example by welding, is an axle 18. The axle 18 is provided with a longitudinally extending slot 19, Figure 3, and the slot 19 defines a keyway for a purpose to be later described.

Slidably mounted on the axle 18 is a sleeve 20 which includes an upper and lower part, Figures 4 and 5. The upper part of the sleeve 20 includes a body member 21 which includes a pair of flat bases 22 and 23, Figure 4. A circular plate 24 is secured to an end of the body member 21 in any suitable manner, as for example by welding, and the body member 21 is provided with a curved or arcuate surface 25 for engaging a portion of the axle 18. A key 26 extends from the body member 21 and the key 26 engages or rides in the slot 19 in the axle 18 so as to maintain the parts in their proper aligned position. Cooperating with the body member 21 is a semi-circular casing 27, Figure 5, and secured to the casing 27 is a pair of spaced parallel blocks 28. Each of the blocks 28 is provided with a pair of openings 29 for a purpose to be later described.

Extending from the plate 24 is a plurality of studs or bolts 30, and the bolts 30 are adapted to extend through suitable openings in the rim 12 of the wheel 11. Suitable nuts 4 may be arranged in threaded engagement with the bolts 30 for clamping the plate 24 to the wheel rim 12.

The body member 21 is provided with a plurality of recesses 31 and 32, Figure 4, and extending through these recesses are bolts 33 which have a substantially U-shape, Figure 3. The bolts 33 also extend through the openings 29 in the blocks 28, and nuts 34 are arranged in threaded engagement with the ends of the bolts 33 for maintaining the parts in assembled relation.

From the foregoing it is apparent that an adjustable sliding axle adapter has been provided which will permit different sizes of wheels to be mounted on a tractor with ease and rapidity. The device can be made of any suitable material such as steel and it includes a plate 14 provided with countersunk holes 15 which receive the studs 16 on the hub of the tractor. A cylindrical axle 18 is welded to the plate 14, and the plate 14 is bolted to the hub 10 of the tractor. It will be understood that the working unit includes two adapters bolted to both the left and right rear hubs of the tractor.

On the plate 24, one half of a sleeve 20 is welded and the other half of the sleeve is not secured to the plate 24 so that the halves of the sleeve may be secured tightly to the axle adapter by means of the two U-bolts 33. The plate 24 is bolted to the rear wheel of the tractor by means of the bolts 30.

The sleeve 20 and plate 24 can then be slid to any desired position along the axle 18 and by tightening the four nuts 34 of the two U-bolts 33, the sleeve can be secured firmly in place. By this adjustment any desired tread width settings may be obtained to accommodate the various widths of rows.

Thus with the adapter of the present invention various tread settings can be obtained with ease and it is only necessary to loosen the four nuts 34 and slide the wheel to any desired position and then tighten the four nuts 34 again. This adapter will be a great labor, time and money saver and can be easily removed for storage in a minimum of space.

I claim:

In an adjustable sliding axle adapter, a circular plate adapted to be secured to a hub of a tractor, said plate being provided with a plurality of countersunk openings, a cylindrical axle of reduced diameter extending outwardly from the center of said plate and secured thereto, there being a longitudinally extending slot in the outer portion of said axle, a sleeve adjustably mounted on said axle and comprising a substantially triangular-shaped body member surrounding a portion of said axle and a lower semi-circular casing surrounding the opposite portion of said axle, a pair of spaced parallel rectangular blocks secured to the outside of said casing at right angles thereto, the ends of said blocks extending beyond said casing, each of said blocks being provided with a pair of openings therein, said openings being arranged on opposite sides of said casing, said substantially triangular shaped body member including a pair of outer flat surfaces arranged at right angles with respect to each other and an inner curved surface for engaging said axle, a key extending from the intermediate portion of said body member for engaging said slot, said key extending parallel to the longitudinal axis of said body member a circular plate secured to one end of said body member and having bolts extending therefrom adapted to be secured to a wheel of a tractor, said body member being provided with a plurality of recesses, bolts of U-shape surrounding said body member and extending through said recesses and through the openings in said blocks, and nuts arranged in engagement with said bolts and arranged contiguous to said blocks, there being a recess in an end of said axle adjacent said first name place, said recess including an outer cylindrical portion and an inner conical portion.

References Cited in the file of this patent

UNITED STATES PATENTS

| | | |
|---|---|---|
| 1,624,278 | Olson | Apr. 12, 1927 |
| 1,822,093 | Hendrickson | Sept. 8, 1931 |
| 2,123,533 | Johnston | July 12, 1938 |
| 2,287,343 | Duda | June 23, 1942 |
| 2,302,570 | Peterson | Nov. 17, 1942 |
| 2,637,598 | Brown | May 5, 1953 |
| 2,655,410 | Brown | Oct. 13, 1953 |